US011151248B1

(12) United States Patent
Batur

(10) Patent No.: US 11,151,248 B1
(45) Date of Patent: Oct. 19, 2021

(54) INCREASING ZERO-DAY MALWARE DETECTION THROUGHPUT ON FILES ATTACHED TO EMAILS

(71) Applicant: NuRD LLC, Clifton, NJ (US)

(72) Inventor: Berker Batur, Ankara (TR)

(*) Notice: Subject to any disclaimer, the term of this patent is extended or adjusted under 35 U.S.C. 154(b) by 0 days.

(21) Appl. No.: 16/566,846

(22) Filed: Sep. 10, 2019

Related U.S. Application Data

(60) Provisional application No. 62/729,616, filed on Sep. 11, 2018.

(51) Int. Cl.
*G06F 21/00* (2013.01)
*G06F 21/56* (2013.01)

(52) U.S. Cl.
CPC .......... *G06F 21/564* (2013.01); *G06F 21/565* (2013.01); *G06F 21/566* (2013.01); *G06F 21/568* (2013.01)

(58) Field of Classification Search
CPC .... G06F 21/564; G06F 21/565; G06F 21/566; G06F 21/568
See application file for complete search history.

(56) References Cited

U.S. PATENT DOCUMENTS

| | | | |
|---|---|---|---|
| 7,673,342 B2 | 3/2010 | Hursey et al. | |
| 7,877,807 B2* | 1/2011 | Shipp | H04L 51/34 726/24 |
| 8,230,023 B2* | 7/2012 | French | G06Q 10/107 709/206 |
| 8,635,700 B2 | 1/2014 | Richard et al. | |
| 8,914,882 B2 | 12/2014 | McDougal et al. | |
| 9,530,119 B1* | 12/2016 | Grisso | H04L 12/1414 |
| 10,250,623 B1* | 4/2019 | Patton | H04L 63/1416 |
| 10,320,810 B1* | 6/2019 | Xu | H04L 63/1408 |
| 10,445,499 B1* | 10/2019 | Xu | G06F 21/56 |
| 10,885,191 B1* | 1/2021 | Gupta | G06F 21/53 |
| 2003/0037116 A1* | 2/2003 | Nolan | G06Q 10/107 709/206 |
| 2005/0086499 A1* | 4/2005 | Hoefelmeyer | G06F 21/567 713/188 |

(Continued)

OTHER PUBLICATIONS

Symantec White Paper, "Internet Security Threat Report", vol. 20, Apr. 2015.

(Continued)

*Primary Examiner* — Ghodrat Jamshidi
(74) *Attorney, Agent, or Firm* — Joseph P. Aiena

(57) ABSTRACT

There is provided a method which forwards an anomaly to cloud based malware analysis and detection system in order to analyze files having this anomaly and increase zero-day malware detection throughput for files attached to emails. The method takes data from a binary file for calculating the true file type and the file extension, then applies a contradiction check to control whether the file extension seen in a file name is consistent with the file type. The file of the attachment is forwarded to a zero-day malware analysis queue, implementing zero-day malware classification, if the file extension is not reflecting the true file type. If the file extension and the true file type are consistent, the method forwards the file of the attachment to a malware analysis and detection queue, implementing traditional unknown file classification.

4 Claims, 6 Drawing Sheets

(56) References Cited

U.S. PATENT DOCUMENTS

| | | | | |
|---|---|---|---|---|
| 2006/0174343 | A1* | 8/2006 | Duthie | H04L 51/12 726/23 |
| 2006/0184632 | A1* | 8/2006 | Marino | G06Q 30/04 709/206 |
| 2011/0302653 | A1* | 12/2011 | Frantz | H04L 63/1408 726/22 |
| 2014/0215617 | A1* | 7/2014 | Smith | H04L 63/1441 726/23 |
| 2014/0280403 | A1* | 9/2014 | Swansegar | G06F 16/9577 707/827 |
| 2015/0096022 | A1* | 4/2015 | Vincent | G06F 21/562 726/23 |
| 2016/0117498 | A1* | 4/2016 | Saxena | G06F 9/5027 726/23 |
| 2017/0289191 | A1* | 10/2017 | Thioux | H04L 63/1441 |
| 2019/0173919 | A1* | 6/2019 | Irimie | G06F 21/577 |
| 2020/0034752 | A1* | 1/2020 | Luo | H04L 51/22 |

OTHER PUBLICATIONS

Yousefi-Azar, Mahmood et al., "Malytics: A Malware Detection Scheme", IEEE Access, vol. 6, pp. 49418-31, Sep. 2018.
Guo, Fanglu et al., "A Study of the Packer Problem and Its Solutions", Recent Advances in Intrusion Detection, Lecture Notes in Computer Science, vol. 5230, pp. 98-115, Sep. 2008.
Vinod, P. et al. "Survey on Malware Detection Methods", Hackers' Workshop on Computer and Internet Security, pp. 74-79, Mar. 2009.
Griffin, Kent et al. "Automatic Generation of String Signatures for Malware Detection", Recent Advances in Intrusion Detection, Lecture Notes in Computer Science, vol. 5758, pp. 101-120, Sep. 2009.
Damodaran, Anusha et al. "A Comparison of Static, Dynamic, and Hybrid Analysis for Malware Detection", Journal of Computer Virology and Hacking Techniques, vol. 13, pp. 1-24, Dec. 2015.
Alazab, Mamoun, et al. "Zero-day Malware Detection based on Supervised Learning Algorithms of API call Signatures", Australasian Data Mining Conference, vol. 121, pp. 171-181, Dec. 2011.

* cited by examiner

INCREASING ZERO-DAY MALWARE DETECTION THROUGHPUT ON FILES ATTACHED TO EMAILS

CROSS REFERENCE TO RELATED APPLICATIONS

This application claims benefit of and priority to U.S. Provisional Application Ser. No. 62/729,616 filed on Sep. 11, 2018 and incorporated by reference herein in its entirety.

BACKGROUND

Files attached to digital mails (emails) are being exchanged between millions of users every day and these files are being sent with several true file types and different content. In order to detect any malicious sample attached to an email, there should be applied different malware analysis and detection techniques together with parsing remaining of the email content. Some of these malicious files are known by industry and could be detected by applying low-cost detection techniques such as signature based, hash based, pattern matching, etc.

In today's cyber security world, millions of new malware files are being distributed every day. Zero-day malware detection requires further applying detailed analysis techniques on unknown files since they were lately compiled and not seen previously. Besides most of the newly seen malware samples are being generated by automatic tools that replicate some existing malware, belonging to some family, by simply applying small changes in the content. This is mainly done to bypass static analysis based detection techniques such as hash based, signature based, static content pattern matching and static content statistical machine learning detection techniques. To overcome this challenge, dynamic analysis and human expert analysis steps are being used by security companies to classify the unknown file as either malicious or benign. Runtime of each method takes more time than the other with given order. Applying dynamic analysis or human expertise on all of the seen unknown files is impossible due to the time constraint.

Traditional approach is to query each file attached to email using some malware detection systems (either using on-premise solutions or cloud based malware analysis and detection systems) and get the verdict if it is known by file's hash. If the file was already classified by any malware detection system as benign or malicious, default actions for each are being performed automatically (either block or allow). If no malicious attachment is found in email, receiving party gets the original email. If any malicious attachment found in email, it is removed from the email and user receives email without malicious attachment and warning message from email server indicating "Malicious content was removed from this email" message. Some email servers/clients forward this incoming message with malicious content to Junk/Spam folders (depending on the user preferences). If the file is unknown, email server may deliver email with unknown attachments to receivers or wait for the scan result of the unknown file. This behaviour can be configured in email server settings by users. Meanwhile, the file is being sent to cloud based malware analysis and detection system, which includes many different detection techniques to classify the unknown as either malware or safe. Some other techniques are also proposed to detect email propagated malware instead of just analyzing attached files.

Existing methods lack of using the anomaly of true file type and given file extension of email attachments. Most of the malicious executable files, distributed over emails, are being sent with common document extensions like .pdf, .doc, .docx, in order to deceive the receivers and make them to open the attachment in their computers. Without applying this anomaly check, all the files are being sent to malware detection infrastructure and go through all the steps in order to be classified. Even if the file turns out to be safe, it takes some time and makes busy the analysis queue.

Thus, there is needed a new method for more effective zero-day malware detection that would reduce the time for analyzing zero-day malware files and detect them without even reach the receiver.

SUMMARY OF THE INVENTION

The current invention is a method to detect zero-day malware, based on prioritization approach for performing a first detection step to reveal possible zero-day malware indication and forwarding these files to detailed malware analysis detection infrastructures.

The present invention method checks an anomaly between true file type and file extension of attached files in email which is a strong indicator that the file is possibly malicious, where the anomaly is the contradiction between true file type and given file extension.

Malware detection system includes automated group of processes, each of them attempts to give a verdict to an unknown sample and label it as clean or malware.

Clean samples are the ones that have no harmful or bad intent on its execution and are safe to run on any client computer. Malware samples are the ones that have harmful or bad intent on its execution that causes damage to the user or computer after its execution.

Trusted verdict sources are non-heuristic malware detection approaches that label a file as malicious or benign with almost 100% reliability, where signature based techniques or human expertise are usually used. Heuristic classifiers in malware detection domain are statistical models, trained with previously labelled samples as malware and clean and being used to give a statistical probability between 0.0-100.0 indicating that sample is malware or not.

Malware experts in malware detection domain are employees with malware analysis expertise who manually analyze an unknown sample and classify it as either malware of safe.

The advantage of this invention is possibility to save time and increase throughput while revealing zero-day malware samples before other antivirus vendors reveal them, using existing analysis techniques, and gaining reputation.

Moreover, by introducing new layers to this invention, a new automated malware analysis technique can be developed which has a great potential to catch zero-day malware samples with a low false positives rate using an integrated whitelisting component.

A benefit of analyzing potential zero-day malware samples within a customized environment is saving time in order to reveal zero-day malware before other antivirus vendors in the industry. When users send an email, incoming email server receives the email content, attached files and corresponding recipients. In terms of security control, attached to an email files are analyzed by one or more security component to classify them either safe, malicious or unknown. File type is an important feature for email attached file classification since some type of files have higher probability to be malicious like PE file type. For this purpose, built-in or on premise software components are being used to scan attached files. Since these components deal with only single email at a time and have no other file scanning interaction, prioritization for scanning of attached files is not necessary. Files that are still unknown after the initial scan are sent to any cloud based malware analysis and detection system depending on the protection strategy used in incoming email server and company which is managing it. In enterprise-level email solutions, unknown files are being sent to cloud analysis system in order not to transmit malicious files to recipients. Since these cloud malware analysis systems may handle incoming files from more than one email server and also files coming from other sources (downloaded files to endpoint machines in that enterprise, etc.), analysis prioritization for unknown files is important.

DETAILED DESCRIPTION

The present invention discloses the method to detect zero-day malware through applying an initial fast inconsistency detection step to any file attached to an email before any kinds of malware detection technique is applied. Email attachment classification system analyses each attached file by several components thus recipients get email messages including no malicious attachment at the end. First the attached file's name and necessary data to calculate its true file-type are collected. Afterwards the contradiction check is performed by analyzing whether the extension seen in file name is consistent with file's true type or not.

Figure 1:
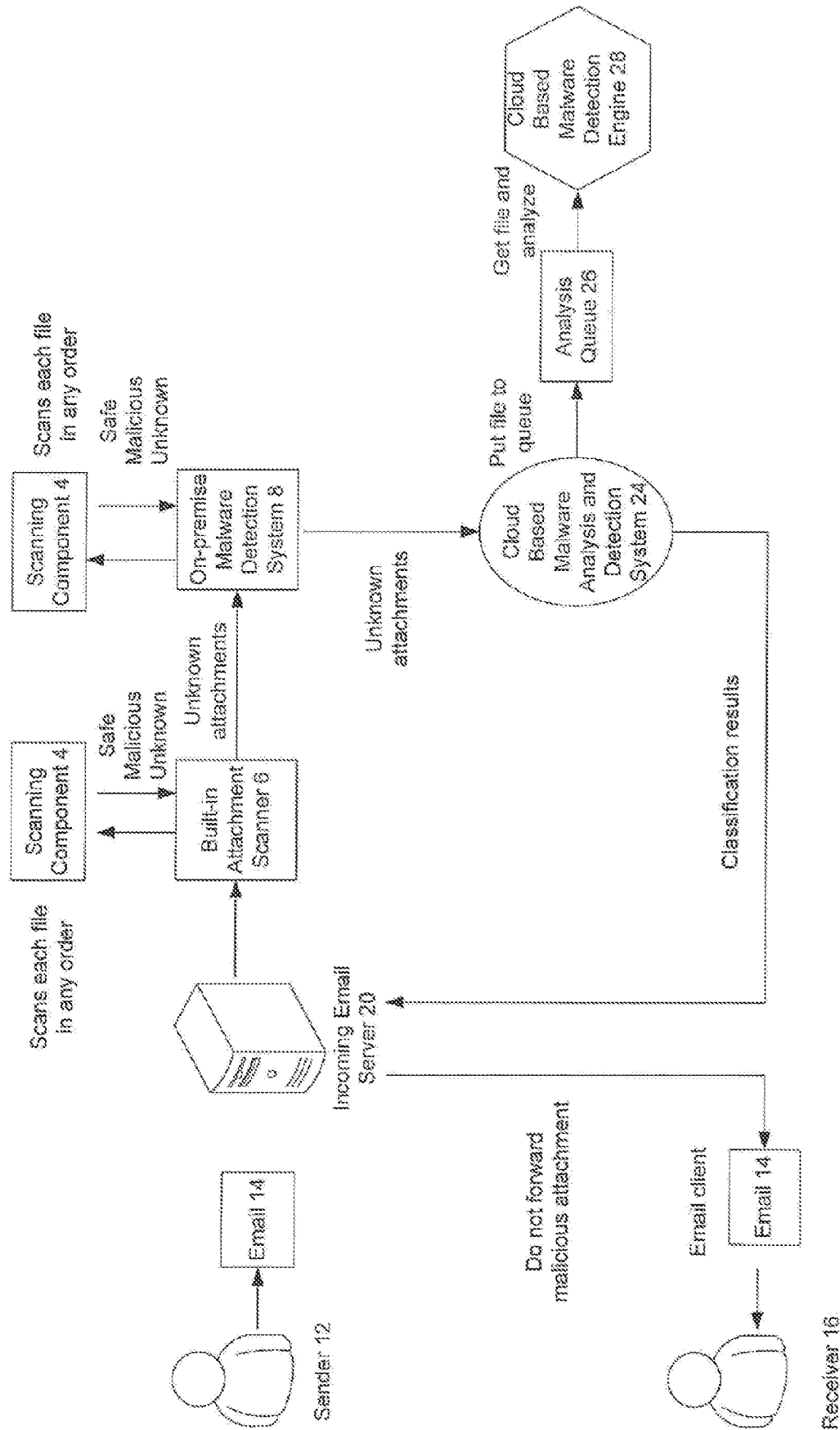
FIG. 1 is a depiction of general scheme of the invention where the email attachment classification system is presented.

FIG. 1 depicts a general scheme of the invention where the email attachment classification system 2 is presented. The email attachment classification system 2 manages connections between scanning components 4, built-in attachment scanner 6, on premise malware detection system 8 and cloud based malware analysis system 10. There is a sender 12 who is sending email 14 to a receiver 16, where sender 12 is an email owner, who is able to send email 14 with or without attached files or attachment 18, and receiver 16 is email owner who receives email 14 that was sent to them. When sender 12 sends the email 14, incoming email server 20, digital server that is capable to receive and send emails between email owners, receives the email content, attached files or attachment 18 and corresponding recipients. In terms of security control, attached to the email files 18 are analyzed by one or more scanning components 4, to classify attachment 18 either safe, malicious or still unknown. Attached file 18 is classified based on file type 22 since some type of files have higher probability to be malicious like PE file type. For this purpose, built-in attachment scanner 6 or on premise malware detection system 8 are being used to scan attached files 18. Since these scanners deal with only single email at a time and have no other file scanning interaction, prioritization for scanning of attached files 18 is not necessary. Files that are still unknown after the initial scan are sent to particular cloud based malware analysis and detection system 24 depending on the protection strategy used in incoming email server 20 and company which is managing it. Cloud based malware analysis and detection system 24 is a combination of malware analysis and detection techniques, where each unknown file is entered to the malware analysis and detection queue 26 and is processed in cloud based malware detection engine 28 with some defined prioritization criteria like FIFO, LIFO, etc. On enterprise-level email solutions, unknown files are being sent to cloud based malware analysis and detection system 24 in order not to transmit malicious files to receiver 16. Since the cloud based malware analysis and detection systems 24 may handle incoming files from more than one email server 20 and also files coming from other sources (files downloaded to endpoint machines in that enterprise, etc.), analysis prioritization for unknown files is important.

Figure 2:
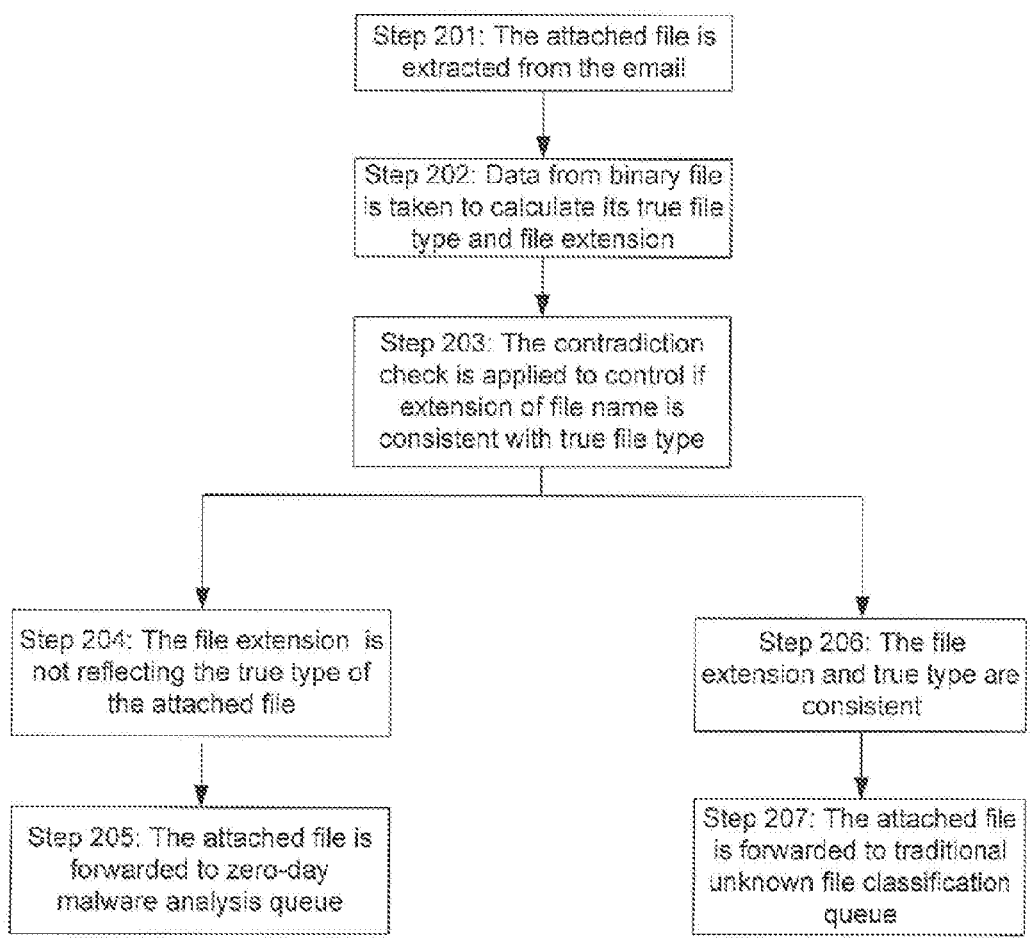
FIG. 2 is a flowchart of the invention where an anomaly between true file type and file extension of attached file is checked.

FIG. 2 is a flowchart of one embodiment of the invention where an anomaly between true file type and file extension of attached file is checked. In step 201 the attached file 18 is extracted from the email 14. In step 202 data from binary file is taken to calculate its true file type and file extension. In step 203 the contradiction check is applied to control whether extension seen in file name is consistent with true file type or not. In step 204 file extension (.pdf, .doc, .exe, .txt, etc.) is not reflecting the true type of the attached file 18 (MS-Word, PE 32/64, Script, etc.). In step 205 the attached file 18 is forwarded to zero-day malware analysis queue 30. In step 206 file extension and true type are consistent. In step 207 the attached file 18 is forwarded to the malware analysis and detection queue 26 for traditional unknown file classification.

Figure 3A:
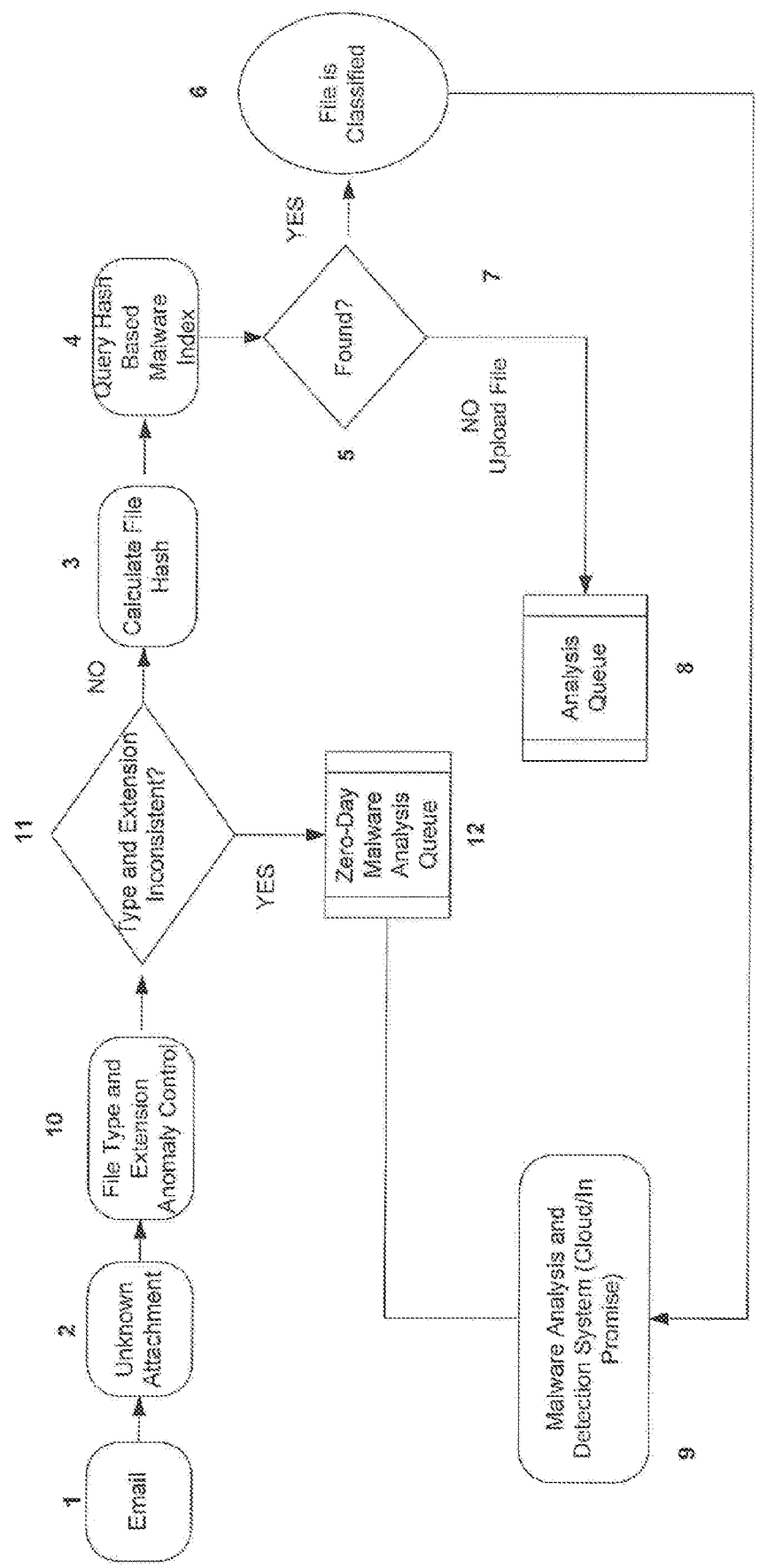
FIG. 3A is a depiction of one embodiment of the invention where the zero-day malware detection architecture is presented.
Figure 3B:
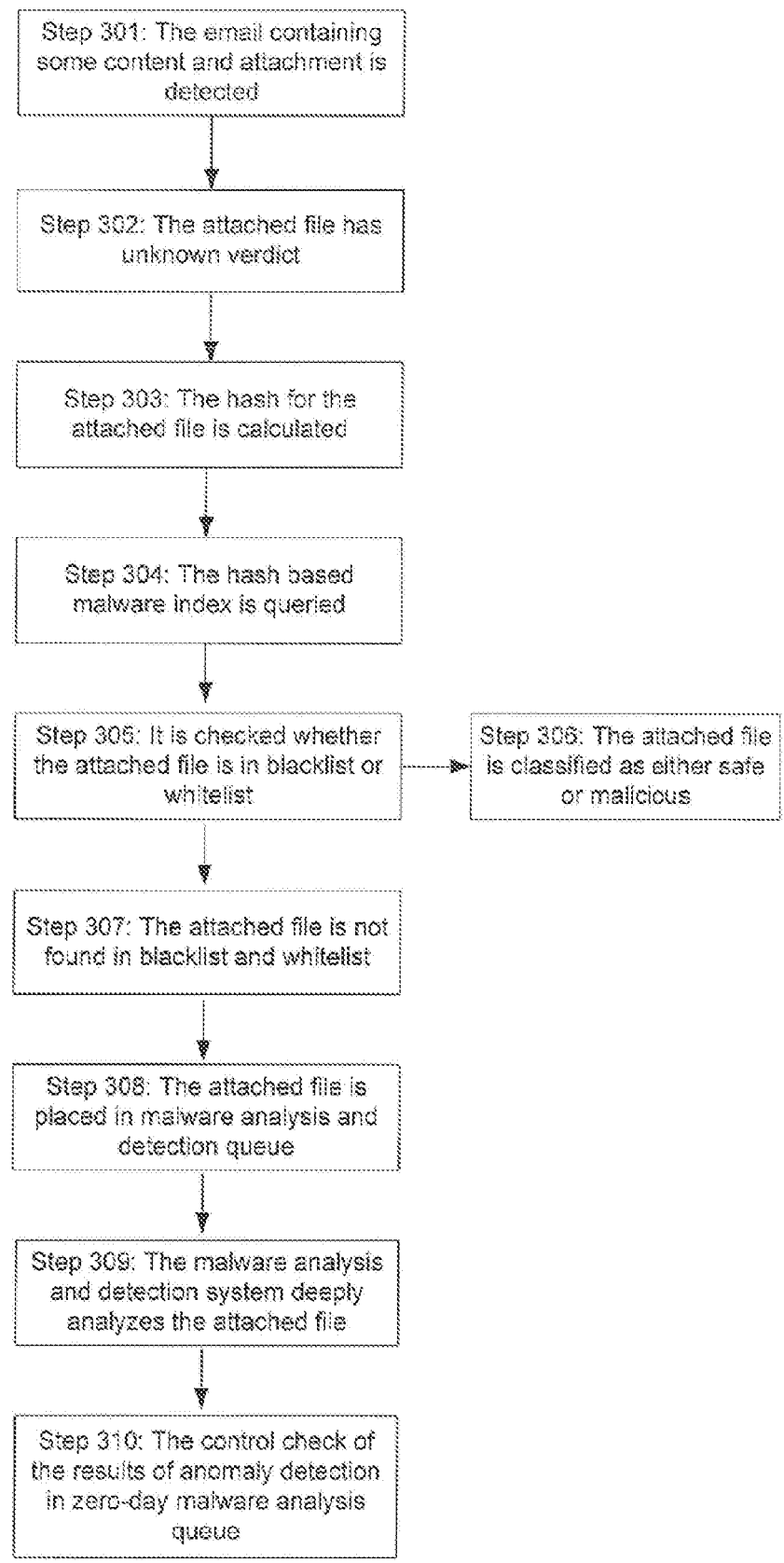
FIG. 3B is a flowchart of one embodiment of the invention where the zero-day malware detection architecture is presented.

FIGS. 3A and 3B are depiction and flowchart of other embodiment of the invention where there is presented zero-day malware detection architecture. In step 301 there is detected the email 14 containing some content and the attachment 18. In step 302 it is defined that the attached file 18 has unknown verdict. In step 303 the hash for the attached file 18 is calculated (SHA1, MD5, SHA256, etc.). In step 304 the hash based malware index is queried. In step 305 it is checked whether the attached file 18 is in blacklist or whitelist. In step 306 the attached file 18 is classified as either safe or malicious, so no further analysis required after this step. In step 307 the attached file 18 is not found in blacklist and whitelist, so further analysis is required. In step 308 the attached file 18 is placed in malware analysis and detection queue 26 with several properties such as priority, custom options, etc. to classify the attached file 18 as either safe or malicious. In step 309 malware analysis and detection system 24, which is mostly located in cloud infrastructure but sometimes in on-premise solutions, deeply analyzes the attached file 18 by using modules of static analysis, of dynamic analysis and of signature check. In step 310 there provided control check of the results of anomaly detection for potential zero-day malware. There is a special zero-day malware analysis queue 30 of special malware detection system 32 for detecting potential zero-day malware samples. Files, coming from this queue, may be forwarded to existing analysis systems with high priority or to a different infrastructure. Also, it is possible to apply different customized analysis techniques specially developed for particular kind of the email attachments 18.

Figure 4:
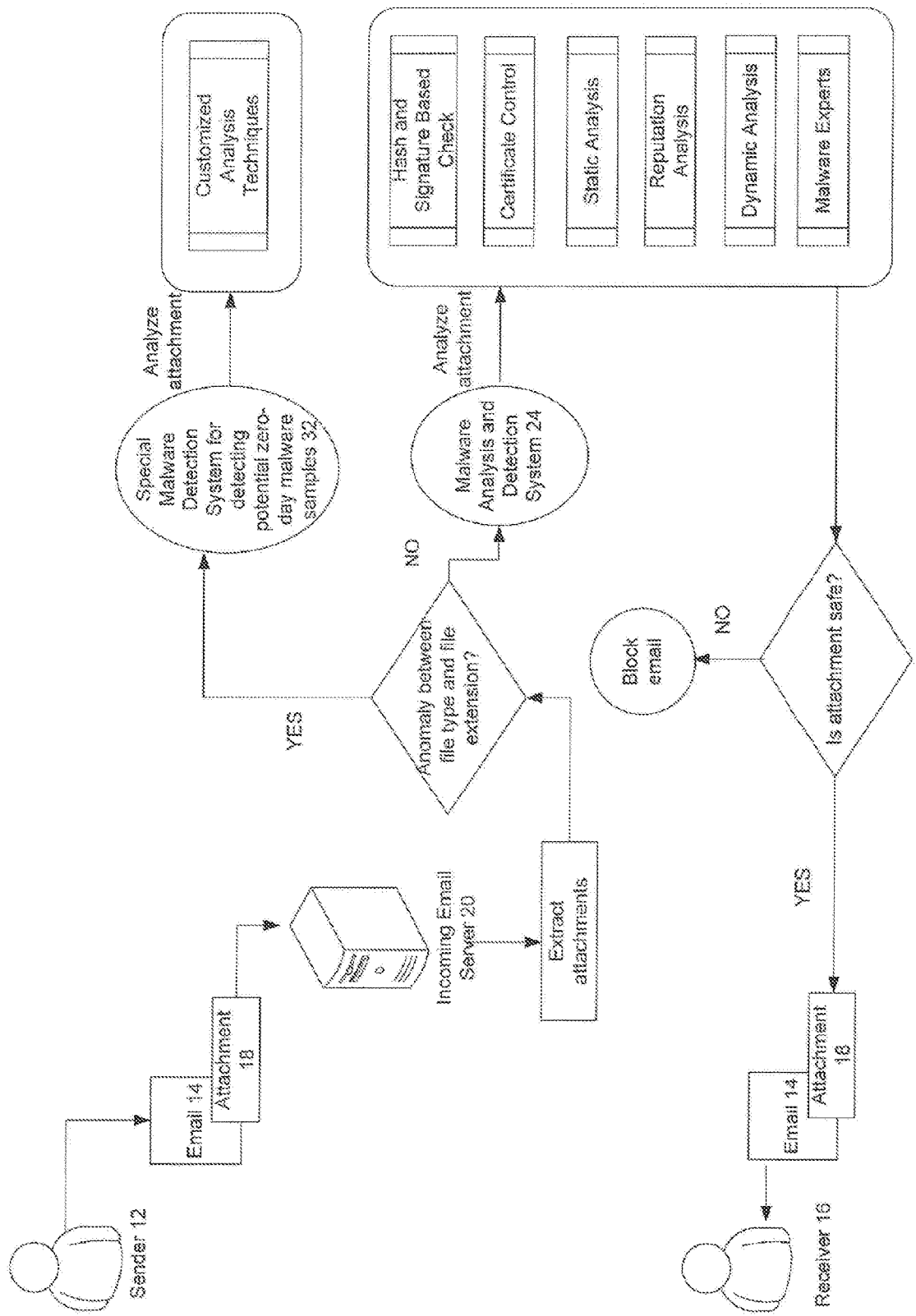
FIG. 4 is a depiction of another embodiment of the invention where the email with the attachment is being sent by the sender.

In FIG. 4 it is shown depiction of other embodiment of the invention where the email 14 with the attachment 18 is being sent by the sender 12. The incoming email server 20 receives the email 14 and extracts the attachment 18. Then the true file type is found for each attachment 18 and it is checked if file extension in file name is consistent for each attachment 18. If any anomaly is found between file true type and extension, the attached file 18 is being forwarded to zero-day malware analysis queue 30 of special malware detection system 32 for detecting potential zero-day malware samples. Other samples are being forwarded to malware analysis and detection queue 26 of malware analysis and detection system 24.

Figure 5:
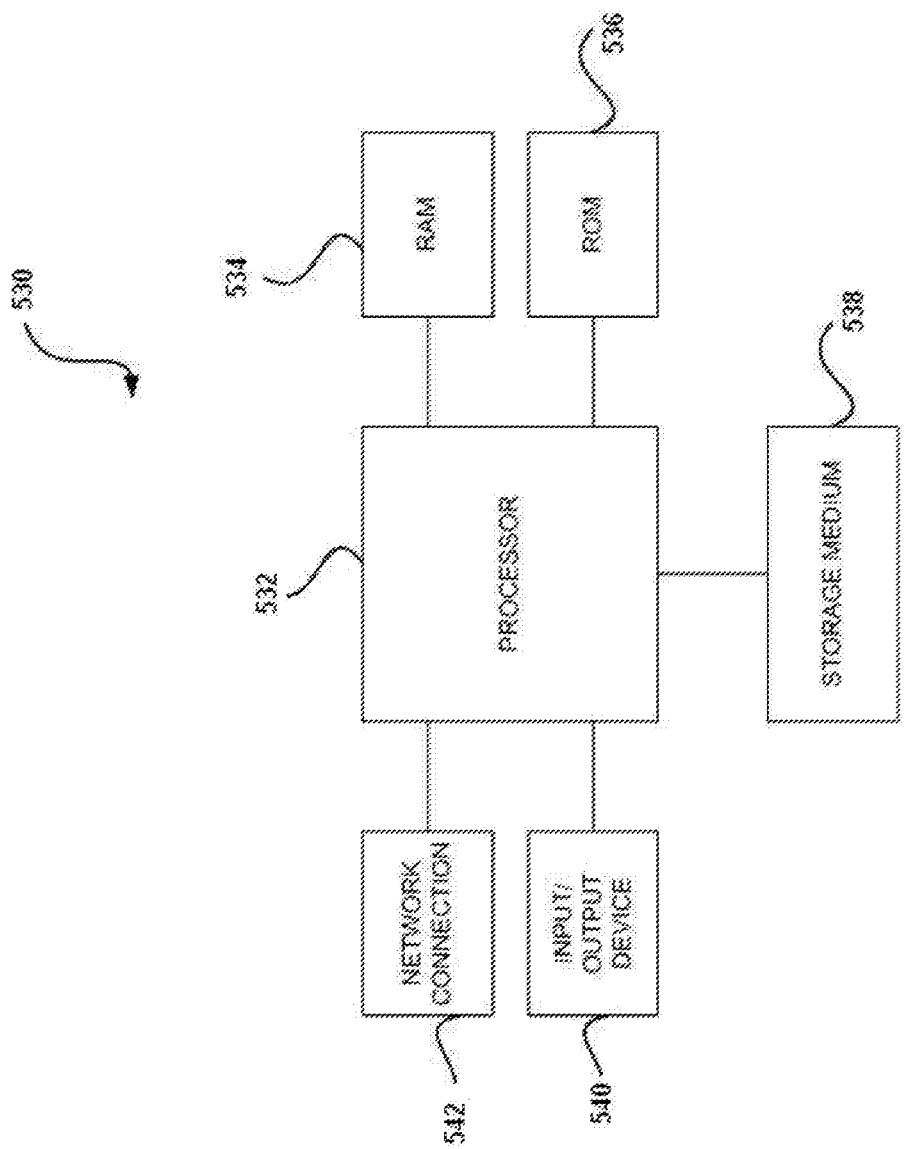
FIG. 5 is an illustration of the processors, memory, and storage devices within a computing device.

The system and method according to the present invention may be implemented on a computer system or devices, such as tablets or smart phone devices. The present invention may be implemented within a system with which may include substantially any suitable computing device. By way of example, the present invention may generally be implemented within an overall computing network which includes a plurality of computing devices. FIG. 5 illustrates a computing device or individual computer system suitable for implementing the present invention. A computing device or individual computer system 530 includes any number of processors 532 (also referred to as central processing units, or CPUs) that are coupled to memory devices including primary storage devices 534 (typically a random access memory, or RAM) and primary storage devices 536 (typically a read only memory, or ROM). ROM acts to transfer data and instructions uni-directionally to the CPU 532, while RAM is used typically to transfer data and instructions in a bi-directional manner.

CPU 532 may generally include any number of processors. Both primary storage devices 534, 536 may include any suitable computer-readable media. A secondary storage medium 538, which is typically a mass memory device, is also coupled bi-directionally to CPU 532 and provides additional data storage capacity. The mass memory device 538 is a computer-readable medium that may be used to store programs including computer code, data, and the like. Typically, mass memory device 538 is a storage medium such as a hard disk or a tape which is generally slower than primary storage devices 534, 536. Mass memory storage device 538 may take the form of a magnetic or paper tape reader or some other well-known device. It will be appreciated that the information retained within the mass memory device 538, may, in appropriate cases, be incorporated in standard fashion as part of RAM 534 as virtual memory. A specific primary storage device 536 such as a CD-ROM may also pass data uni-directionally to the CPU 532.

CPU 532 is also coupled to one or more input/output devices 540 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 532 optionally may be coupled to a computer or telecommunications network, e.g., a local area network, an internet network or an intranet network, using a network connection as shown generally at 542. With such a network connection, it is contemplated that the CPU 532 might receive information from the network, or might output information to the network in the course of performing the above-described method steps. Such information, which is often represented as a sequence of instructions to be executed using CPU 532, may be received from and outputted to the network, for example, in the form of a computer data signal embodied in a carrier wave. The above-described devices and materials will be familiar to those of skill in the computer hardware and software arts.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "computer readable storage medium" may be any tangible medium (but not a signal medium—which is defined below) that can contain, or store a program. The terms "machine readable medium," "computer-readable medium," or "computer readable storage medium" are all non-transitory in their nature and definition. Non-transitory computer readable media comprise all computer-readable media except for a transitory, propagating signal.

The term "machine-readable signal" refers to any signal used to provide machine instructions and/or data to a programmable processor. A "computer readable signal medium" may be any computer readable medium that is not a computer readable storage medium and that can communicate, propagate, or transport a program.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The invention is not restricted to the details of the foregoing embodiments. The invention extend to any novel one, or any novel combination, of the features disclosed in this specification (including any accompanying claims, abstract and drawings), or to any novel one, or any novel combination, of the steps of any method or process so disclosed.

What is claimed is:

1. A method to detect zero-day malware comprising:
    sending an email with an attachment which contains one or more files by a sender to a receiver;
    intercepting said sent email with said attachment by an incoming email server;
    using scanning components, including a built-in attachment scanner and/or an on premise malware detection system, for analyzing and classifying said files from said attachment;
    classifying said files from said attachment as safe, malicious or unknown;
    classifying said files from said attachment based on a file type;
    excluding a prioritization step for scanning of said files from said attachment when said scanning components deal with only single said email at a time and have no other file scanning interaction;
    analysing, by a cloud based malware analysis and detection system, said unknown after first scanning files, that enters said unknown file to a malware analysis and detection queue and processes said unknown file in a cloud based malware detection engine with some defined prioritization criteria including FIFO (First In First Out) and LIFO (Last In First Out); and
    including analysis prioritization step for said unknown files since said cloud based malware analysis and detection system handles incoming files from more than one email server and also files coming from other sources including files downloaded to endpoint machines;
    whereas the zero-day malware detection throughput for said files attached to said emails is increased by forwarding all said files which extension does not correspond file type to said cloud based malware analysis and detection system;
    whereas each said file of said attachment is analyzed so said receiver obtains said email including no malicious attachment at the end.

2. The method according to claim 1 to detect zero-day malware, where there is checked an anomaly between a true file type and a file extension of said file from said attachment comprising:
    extracting said file of said attachment from said email;
    taking a data from a binary file for calculating said true file type and said file extension;
    applying a contradiction check to control whether said file extension seen in a file name is consistent with said true file type or not;
    forwarding said file of said attachment to a zero-day malware analysis queue, implementing zero-day malware classification, if said file extension is not reflecting said true file type;
    forwarding said file of said attachment to said malware analysis and detection queue, implementing unknown file classification, if said file extension and said true file type are consistent.

3. The method according to claim 1 to detect zero-day malware, further comprising where said cloud based malware analysis and detection system analyzes said files in said attachment comprising:
    detecting said email containing said attachment;
    defining that said file from said attachment has unknown verdict;
    calculating a hash for said file from said attachment;
    querying a hash based malware index;
    checking whether said file from said attachment is in a blacklist or a whitelist;
    finishing analysis process if said file from said attachment is classified as either safe or malicious;
    proceeding with further analysis if said file from said attachment is not found in said blacklist and said whitelist;
    placing said file from said attachment in said malware analysis and detection queue with several properties including priority and custom options, to classify said file from said attachment as either safe or malicious;
    analyzing said file from said attachment by said cloud based malware analysis and detection system by using modules of static analysis, of dynamic analysis and of signature check, whereas said malware analysis and detection system which is located in cloud infrastructure is implemented in on-premise solutions;
    placing said file from said attachment to said zero-day malware analysis queue for detecting potential zero-day malware samples; and
    forwarding said file from said attachment, coming from said zero-day malware analysis queue, to any available analysis systems with priority, and analyzing said file from said attachment by applying customized analysis techniques specially developed for particular kind of said attachment.

4. A system for detecting zero-day malware, based on prioritization approach for performing a first detection step to reveal possible zero-day malware indication and forwarding files to detailed malware analysis detection infrastructures comprising:
    one or more hardware processor and memory;
    an email with an attachment which contains said files that was sent by a sender device to a receiver device, said sender device and said receiver device each having a processor and a memory;
    an incoming email server that intercepts said sent email with said attachment and extracts said attachment;
    scanning components, including a built-in attachment scanner and/or an on premise malware detection system, for analyzing and classifying said files from said attachment, whereas a prioritization of said email is not needed;
    said files from said attachment that are classified as safe, malicious or unknown;
    a file type by which said files from said attachment are classified;
    a file extension and a file name that are compared for checking an anomaly between said file extension and said file name;

a cloud based malware analysis and detection system, used for analyzing said unknown after first scanning files, where said cloud based malware analysis and detection system is a combination of malware analysis and detection techniques, that enters said unknown file to a malware analysis and detection queue and processes said unknown file in a cloud based malware detection engine with defined prioritization criteria including FIFO (First In First Out), and LIFO (Last In First Out), whereas a prioritization of said email is needed;

a special malware detection system with a special zero-day malware analysis queue for detecting potential zero-day malware samples, whereas files, coming from said queue are forwarded to existing analysis systems with priority or to a different infrastructure.

\* \* \* \* \*